(12) United States Patent
Werner et al.

(10) Patent No.: US 11,431,380 B2
(45) Date of Patent: Aug. 30, 2022

(54) WRAP PLUG ATTENUATION ADJUSTMENT TOOL

(71) Applicant: INTERNATIONAL BUSINESS MACHINES CORPORATION, Armonk, NY (US)

(72) Inventors: John S. Werner, Fishkill, NY (US); Faezeh Gholami, Ridgewood, NJ (US); Noah Singer, White Plains, NY (US); John Torok, Poughkeepsie, NY (US); Philip A. Sciuto, Poughkeepsie, NY (US); Arkadiy O. Tsfasman, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 350 days.

(21) Appl. No.: 15/931,675

(22) Filed: May 14, 2020

(65) Prior Publication Data
US 2021/0359717 A1 Nov. 18, 2021

(51) Int. Cl.
| | |
|---|---|
| *H04B 3/48* | (2015.01) |
| *G02B 6/38* | (2006.01) |
| *G02B 6/245* | (2006.01) |
| *G02B 6/26* | (2006.01) |
| *G02B 6/12* | (2006.01) |

(52) U.S. Cl.
CPC ............. *H04B 3/48* (2013.01); *G02B 6/245* (2013.01); *G02B 6/266* (2013.01); *G02B 6/3825* (2013.01); *G02B 6/3847* (2013.01); *G02B 2006/12119* (2013.01)

(58) Field of Classification Search
CPC ................. G02B 6/266; G02B 2006/12119
See application file for complete search history.

(56) References Cited

U.S. PATENT DOCUMENTS

| | | | |
|---|---|---|---|
| 4,234,253 A | 11/1980 | Higginbotham | |
| 5,076,688 A | 12/1991 | Bowen | |
| 5,367,159 A * | 11/1994 | Schofield | G02B 6/266 |
| | | | 385/140 |
| 6,464,402 B1 | 10/2002 | Andrews | |
| 6,483,631 B1 | 11/2002 | Cheng | |

(Continued)

FOREIGN PATENT DOCUMENTS

| | | |
|---|---|---|
| CA | 2306305 A1 | 10/2000 |
| CN | 101363944 A | 10/2010 |

(Continued)

*Primary Examiner* — Tina M Wong
(74) *Attorney, Agent, or Firm* — Tihon Poltavets (57) ABSTRACT

An apparatus for an attenuation adjustment tool, the attenuation adjustment tool includes a body with an adjustment arm positioned at a first side of the body, where an actuator is configured to extend and retract the adjustment arm. The attenuation adjustment tool further includes an input port and an output port positioned at the first side of the body, wherein an input prong and an output prong of a wrap plug are each respectively insertable into the input port and the output port. The attenuation adjustment tool further includes the adjustment arm configurable to engage with a mechanism on the wrap plug, wherein the mechanism is configurable to alter a shape of a signal cable in the wrap plug.

20 Claims, 7 Drawing Sheets

(56) References Cited

U.S. PATENT DOCUMENTS

| | | | |
|---|---|---|---|
| 6,941,071 B2 * | 9/2005 | Demsky | H04B 10/07 |
| | | | 398/139 |
| 7,065,284 B2 | 6/2006 | Ao | |
| 7,212,721 B2 * | 5/2007 | Imai | G02B 6/352 |
| | | | 385/140 |
| 7,504,630 B2 | 3/2009 | Wang | |
| 7,756,418 B2 | 7/2010 | Ofalt | |
| 8,041,178 B2 * | 10/2011 | Lu | G02B 6/3885 |
| | | | 430/311 |
| 10,972,182 B1 * | 4/2021 | Werner | H04B 10/1143 |
| 2004/0126081 A1 * | 7/2004 | Hong | G02B 6/266 |
| | | | 385/140 |
| 2006/0280421 A1 * | 12/2006 | Tanaka | G02B 26/02 |
| | | | 385/140 |
| 2021/0359717 A1 * | 11/2021 | Werner | H04B 3/48 |

FOREIGN PATENT DOCUMENTS

| | | |
|---|---|---|
| GB | 8610580 | 6/1986 |
| GB | 2189902 A | 11/1987 |

* cited by examiner

WRAP PLUG ATTENUATION ADJUSTMENT TOOL

FIELD OF THE INVENTION

This disclosure relates generally to adjustable attenuation wrap plugs, and in particular, to an attenuation adjustment tool for setting an attenuation for the adjustable attenuation wrap plug.

BACKGROUND OF THE INVENTION

A wrap plug (i.e., loopback plug) is commonly utilized to test fiber optic transceivers, where transmitted data (output) is looped back as received data (input) simulating a complete communications link utilizing a single device. The wrap plug is designed to provide a specific attenuation for signals that would have to travel a desired distance when implemented in an end product (e.g., server equipment). For testing a fiber optic link at the end product to ensure proper communication at multiple distances requires multiple wrap plugs of different attenuation levels, where a technician has to physically swap out the multiple wrap plugs of different attenuation levels.

SUMMARY

One aspect of an embodiment of the present invention discloses an apparatus for a wrap plug attenuation adjustment tool, the apparatus comprising, a body with an adjustment arm positioned at a first side of the body, wherein an actuator is configured to extend and retract the adjustment arm. The apparatus further comprising an input port and an output port positioned at the first side of the body, wherein an input prong and an output prong of a wrap plug are each respectively insertable into the input port and the output port. The apparatus further comprising the adjustment arm configurable to engage with a mechanism on the wrap plug, wherein the mechanism is configurable to alter a shape of a signal cable in the wrap plug.

A second aspect of an embodiment of the present invention discloses a method for configuring a warp plug utilizing an attenuation adjustment tool, the method comprising, responsive to receiving a desired attenuation level for the wrap plug, sending, by one or more processors, a test signal through the wrap plug. The method further comprising, measuring, by one or more processors, a current attenuation level for the wrap plug based on the test signal. The method further comprising, responsive to determining the current attenuation level does not match the desired attenuation level, performing, by one or more processors, an adjustment to the wrap plug, wherein an adjustment arm on the attenuation adjustment tool engages a mechanism on the wrap plug to alter a shape of a signal cable in the wrap plug.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Embodiments of the present invention provide an attenuation adjustment tool for adjusting an attenuation level for a wrap plug. Embodiments of the present invention provide a body with an adjustment arm positioned at a first side, where an actuator is configured to extend and retract the adjustment arm. An input port and an output port are positioned at the first side of the body, where an input prong and an output prong of the wrap plug are each respectively insertable into the input port and the output port. The adjustment arm is configurable to engage with a mechanism on the wrap plug, where the mechanism is configurable to alter a shape of a signal cable encased in the wrap plug. Altering the shape of the signal cable encased in the wrap plug alters an attenuation level for the wrap plug, where the wrap plug is subsequently utilized to test an optical port on an end product.

Embodiments of the present invention also provide a method for configuring the warp plug utilizing the attenuation adjustment tool. An attenuation adjustment program operating on the attenuation adjustment tool can receive a desired attenuation level for the wrap plug and send a test signal through the wrap plug temporarily coupled to the attenuation adjustment tool. The attenuation adjustment program measures a current attenuation level for the wrap plug based on the test signal and responsive to determining a current attenuation level does not match the desired attenuation level, the attenuation adjustment program performs an adjustment to the wrap plug. The adjustment is performed by the adjustment arm on the attenuation adjustment tool which engages a mechanism on the wrap plug to alter a shape of a signal cable in the wrap plug and thus, altering an attenuation level for the wrap plug.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

Figure 1A:
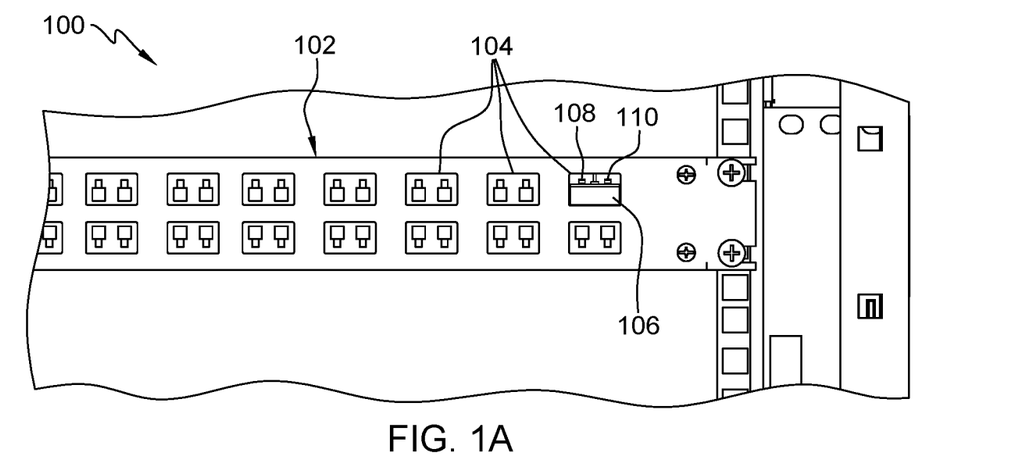
FIG. 1A depicts a front view of an adjustable attenuation wrap plug installed on an end product, in accordance with an embodiment of the present invention.

FIG. 1A depicts a front view of an adjustable attenuation wrap plug installed on an end product, in accordance with an embodiment of the present invention. End product 100 represents server equipment with optical port panel 102 that includes multiple optical ports 104 with multiple input 108 and output 110 pairs. Adjustable attenuation wrap plug 106 is inserted (i.e., plugged) into a single optical port 104 with a single input 108 and output 110 pair, where a loopback test is being performed on the single optical port 104. Adjustable attenuation wrap plug 106 is configured to route data transmitted from output 110 back to input 108 as received data, thus simulating a complete communication link (i.e. loop back). Adjustable attenuation wrap plug 106 is configurable to various attenuations to simulate signals requiring a desired distance of travel. Adjustable attenuation wrap plug 106 is discussed in further detail with regards to FIG. 3.

Figure 1B:
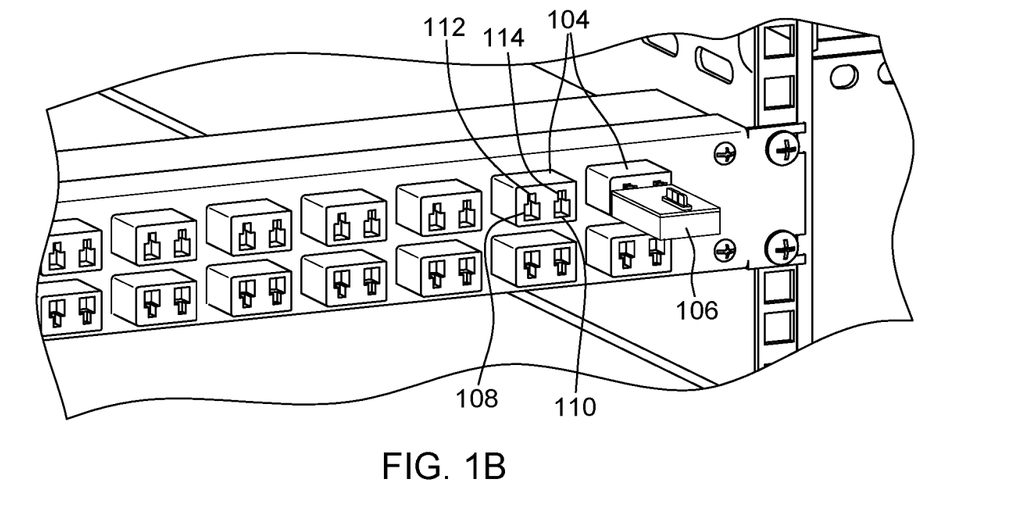
FIG. 1B depicts a 3-dimensional view of an adjustable attenuation wrap plug installed on an end product, in accordance with an embodiment of the present invention.

FIG. 1B depicts a 3-dimensional view of an adjustable attenuation wrap plug installed on an end product, in accordance with an embodiment of the present invention. Dimensions of adjustable attenuation wrap plug 106 are such that multiple adjustable attenuation wrap plugs 106 can be inserted into respective optical ports 104 without interfering with one another. A technician has the ability to set an attenuation level on adjustable attenuation wrap plug 106 and insert adjustable attenuation wrap plug into optical port 104. If the attenuation level needs to be adjusted, the technician can remove adjustable attenuation wrap plug 106, adjust the attenuation level, and re-insert adjustable attenuation wrap plug 106 back into optical port 104. In this embodiment, adjustable attenuation wrap plug 106 is insertable into optical port 104 in a single orientation, where protruding compressible clips of adjustable attenuation wrap plug 106 align with corresponding input clip cavity 112 at input 108 and output clip cavity 114 at output 110. In other embodiments, adjustable attenuation wrap plug 106 does not have protruding compressible clips, allowing for adjustable attenuation wrap plug 106 to be inserted in two orientations.

Figure 2:
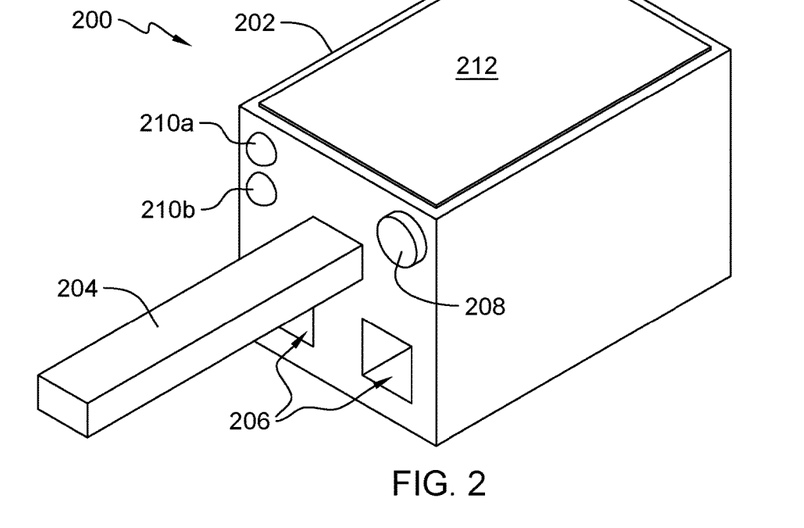
FIG. 2 depicts a 3-dimensional front view of a wrap plug attenuation adjustment tool, in accordance with an embodiment of the present invention.

FIG. 2 depicts a 3-dimensional front view of a wrap plug attenuation adjustment tool, in accordance with an embodiment of the present invention. Attenuation adjustment tool 200 includes body 202 and adjustment arm 204, where attenuation adjustment tool 200 extends and retracts adjustment arm 204 from body 202 utilizing at least one linear actuator. Adjustment arm 204 is configurable to accept an attenuation adjustment mechanism on adjustable attenuation wrap plug 106, such as, attenuation adjustment pawl 320 discussed in further detail with regards to FIG. 3. Furthermore, adjustment arm 204 has the ability to activate and deactivate a locking mechanism on adjustable attenuation wrap plug 106 to prevent attenuation adjustment pawl 320 from being inadvertently moved during installation on optical port panel 102. Attenuation adjustment tool 200 further includes optical ports 206, selection button 208, and status indicators 210a and 210b. Optical ports 206 represent input and output ports for insertion of input prong 310 and output prong 314 of adjustable attenuation wrap plug 106, discussed in further detail with regard to FIG. 3. Selection button 208 is utilized to activate and deactivate adjustment arm 204 when setting a desired attenuation level on adjustable attenuation wrap plug 106. Status indicator 210a and 210b provide a visual representation of whether an attenuation adjustment is in progress, an error has occurred during the attenuation adjustment, and/or a desired attenuation level for adjustable attenuation wrap plug 106 has been reached. Attenuation adjustment tool 200 can also include display 212, discussed in further detail with regards to FIG. 5.

Figure 3:
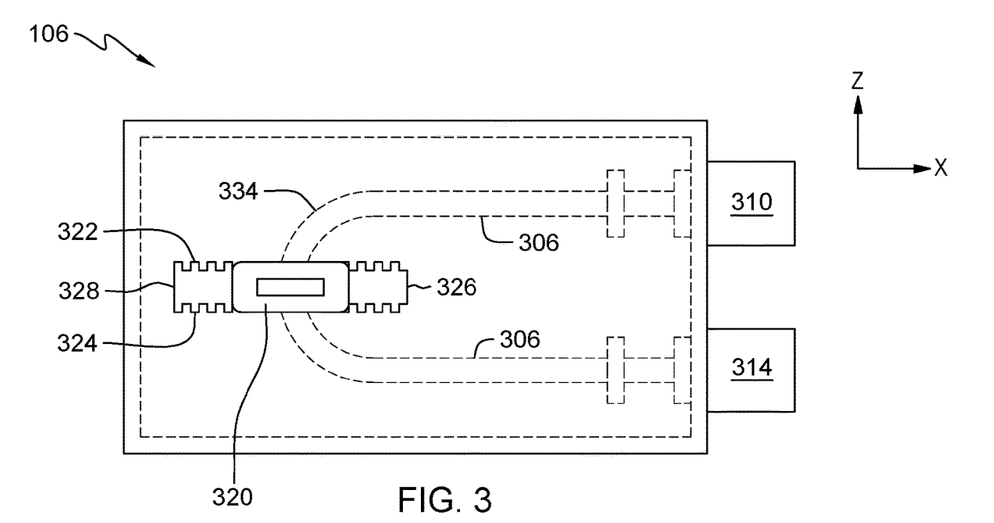
FIG. 3 depicts a transparent top view of an adjustable attenuation wrap plug in an undeformed state, in accordance with an embodiment of the present invention.

FIG. 3 depicts a transparent top view of an adjustable attenuation wrap plug in an undeformed state, in accordance with an embodiment of the present invention. Adjustable attenuation wrap plug 106 includes a housing which consists of bottom portion and top portion, wherein the bottom portion and the top portion form a cavity that encases optical fiber 306. A first end of optical fiber 306 is electrically connected to input prong 310 for coupling to output 110 of optical port 104 (previously discussed with regards to FIG. 1A) and for insertion into optical port 206 of attenuation adjustment tool 200 (previously discussed with regards to FIG. 2). A second end of optical fiber 306 is electrically connected to output prong 314 for electrically coupling to input 108 of optical port 104 (previously discussed with regards to FIG. 1A) and for insertion into optical port 206 of attenuation adjustment tool 200 (previously discussed with regards to FIG. 2). An apex of optical fiber 306 is disposed between an inner apex member and an outer apex member, where the inner apex member and the outer apex member protrude from attenuation adjustment pawl 320. Attention adjustment pawl 320 engages with a linear gear path to create a ratchet mechanism that includes upper linear path 322 and lower linear path 324, where first end stop 326 and second end stop 328 define the bounds of the linear gear path with which attenuation adjustment pawls 320 engages to form the ratchet mechanism.

In the undeformed state, undeformed bend radius 334 represents a radius at which optical fiber 306 would experience the least amount of attenuation when a signal is passed through output prong 314 and input prong 310. Attenuation adjustment pawl 320 is positioned between first end stop 326 and second end stop 328 along the linear gear path. Attenuation adjustment tool 200 is configurable to move attenuation adjustment pawl 320 via adjustment arm 204 towards second end stop 328 resulting in optical fiber 306 being pulled and deformed. Attenuation adjustment tool 200 is configurable to move attenuation adjustment pawl 320 via adjustment arm 204 towards first end stop 326 resulting in optical fiber 306 being pushed and deformed, creating two additional bend radii. A force applied by adjustment arm 204 to adjustment pawl 320 in the x-axis direction results in attenuation adjustment pawl 320 moving along the linear gear path, where adjustment arm 204 pulls optical fiber 306 in the −x-axis direction and pushes optical fiber 306 in the +x-axis direction.

Figure 4A:
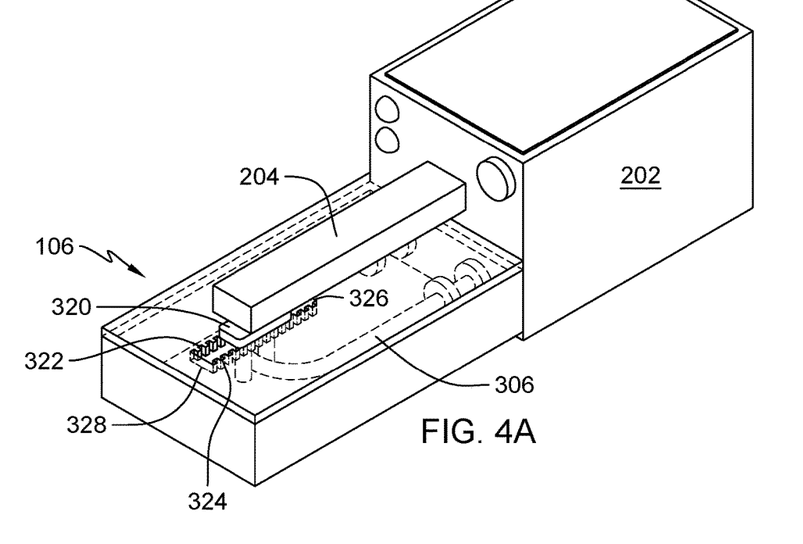
FIG. 4A depicts a 3-dimensional view of a wrap plug attenuation adjustment tool with an adjustable attenuation wrap plug in an undeformed state, in accordance with an embodiment of the present invention.

FIG. 4A depicts a 3-dimensional view of a wrap plug attenuation adjustment tool with an adjustable attenuation wrap plug in an undeformed state, in accordance with an embodiment of the present invention. Attenuation wrap plug 106 is inserted into attenuation adjustment tool 200, where input prong 310 and output prong 314 (as illustrated in FIG. 3) are disposed in respective optical ports 206 of body 202 of attenuation adjustment tool 200. Adjustment arm 204 engages with attenuation adjustment pawl 320, where an extension or retraction of adjustment arm 204 from body 202 utilizing a linear mechanism translates to attenuation adjustment pawl 320. As a result, the extension or retraction of adjustment arm 204 cause attenuation adjustment pawl to move along the linear gear path defined by upper linear path 322, lower linear path 324, first end stop 326, and second end stop 328. The movement of attenuation adjustment pawl 220 results in deformation of optical fiber 306 and an alteration in the attenuation provided by adjustable attenuation wrap plug 106.

Figure 4B:
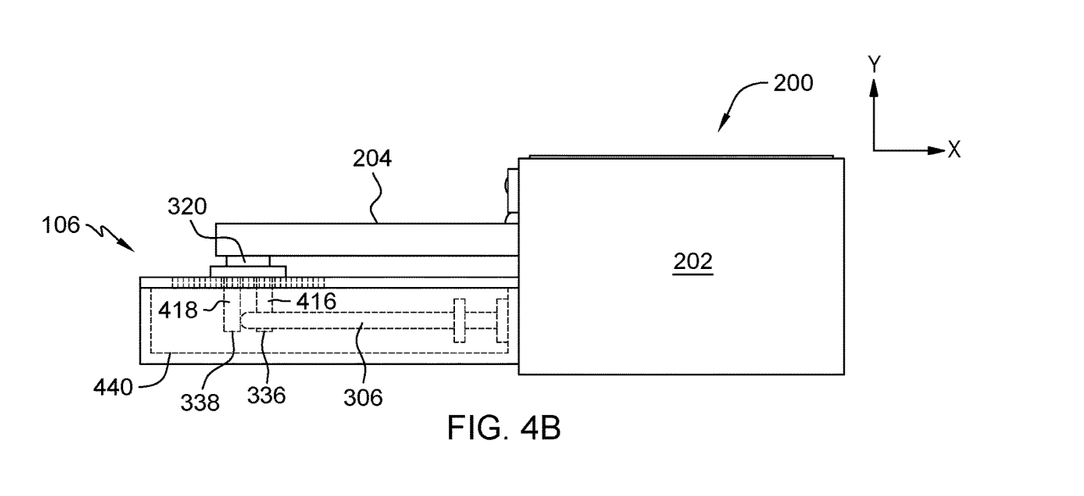
FIG. 4B depicts a side view of a wrap plug attenuation adjustment tool with an adjustable attenuation wrap plug in an undeformed state, in accordance with an embodiment of the present invention.

FIG. 4B depicts a side view of a wrap plug attenuation adjustment tool with an adjustable attenuation wrap plug in an undeformed state, in accordance with an embodiment of the present invention. As previous discussed, an apex of optical fiber 306 is disposed between inner apex member 416 and outer apex member 418, where a movement of attenuation adjustment pawl 320 results in optical fiber 306 being pulled in the −x-axis direction or pushing in the +x-axis direction. Inner apex member 416 protrudes from attenuation adjustment pawl 320, where a height of cavity 436 between a first end of inner apex member 416 and inner surface 440 of a bottom portion of adjustable attenuation wrap plug 106 is smaller than a diameter of optical fiber 306. As a result, as adjustment arm 204 extends from body 202 of attenuation adjustment tool 200, inner apex member 416 pulls optical fiber 306 at the apex without optical fiber 306 passing through cavity 436. Similarly, outer apex member 418 protrudes from attenuation adjustment pawl 320, where a height of cavity 438 between a first end of outer apex member 418 and inner surface 440 of the bottom portion of adjustable attenuation wrap plug 106 is smaller than a diameter of optical fiber 306. As a result, as adjustment arm 204 retracts into body 202 of attenuation adjustment tool 200, outer apex member 418 pushes against optical fiber 306 at the apex without optical fiber 306 passing through cavity 438.

Figure 4C:
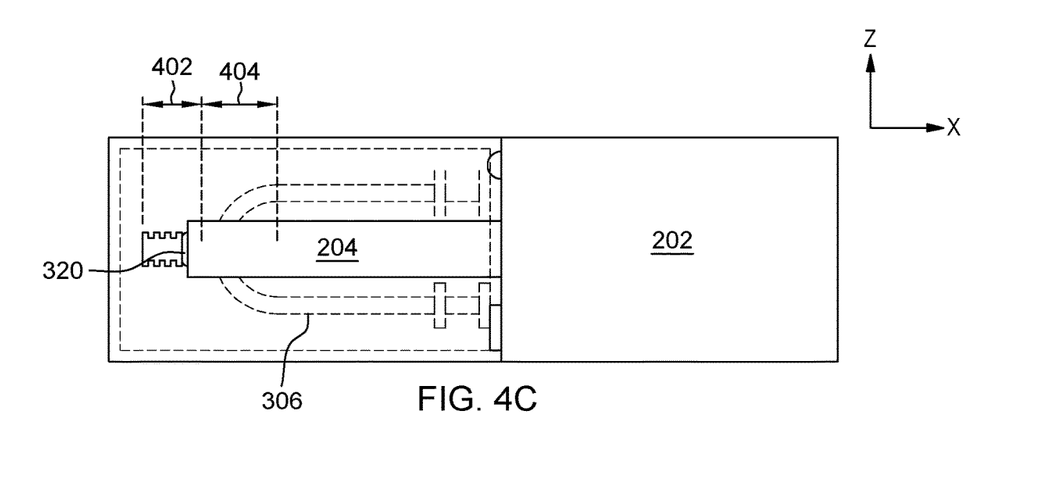
FIG. 4C depicts a top view of a wrap plug attenuation adjustment tool with an adjustable attenuation wrap plug in an undeformed state, in accordance with an embodiment of the present invention.

FIG. 4C depicts a top view of a wrap plug attenuation adjustment tool with an adjustable attenuation wrap plug in an undeformed state, in accordance with an embodiment of the present invention. Movement of adjustment arm 204 relative to body 202 in the −x-axis direction results in a transition from the undeformed state to a partially deformed state, where partially deformed bend radius represents a radius at which optical fiber 306 would experience an increased amount attenuation when a signal is passed through output prong 314 and input prong 310 relative to the illustrated undeformed state. Attenuation adjustment pawl 320 is moved in the −x-axis direction by adjustment arm 204, thus pulling optical fiber 306 and decreasing bend radius at the apex of optical fiber 306 until the partially deformed bend radius is reached. Distance 402 represents a measured change in position of attenuation adjustment pawl 320 between the undeformed state and the partially deformed state.

Movement of adjustment arm 204 relative to body 202 in the +x-axis direction results in a transition from the undeformed state to a fully deformed state, where resulting multiple fully deformed bend radii represent a radii at which optical fiber 306 would experience a maximum amount of attenuation when a signal is passed through output prong 314 and input prong 310 relative to the illustrated undeformed state and the partially deformed state. Attenuation adjustment pawl 320 is moved in the +x-axis direction by adjustment arm 204, thus pushing optical fiber 306 and increasing the amount of bend radii of optical fiber 306 until the fully deformed bend radii are reached. Distance 404 represents a measured change in position of attenuation adjustment pawl 320 between the undeformed state and the fully deformed state.

Figure 5:
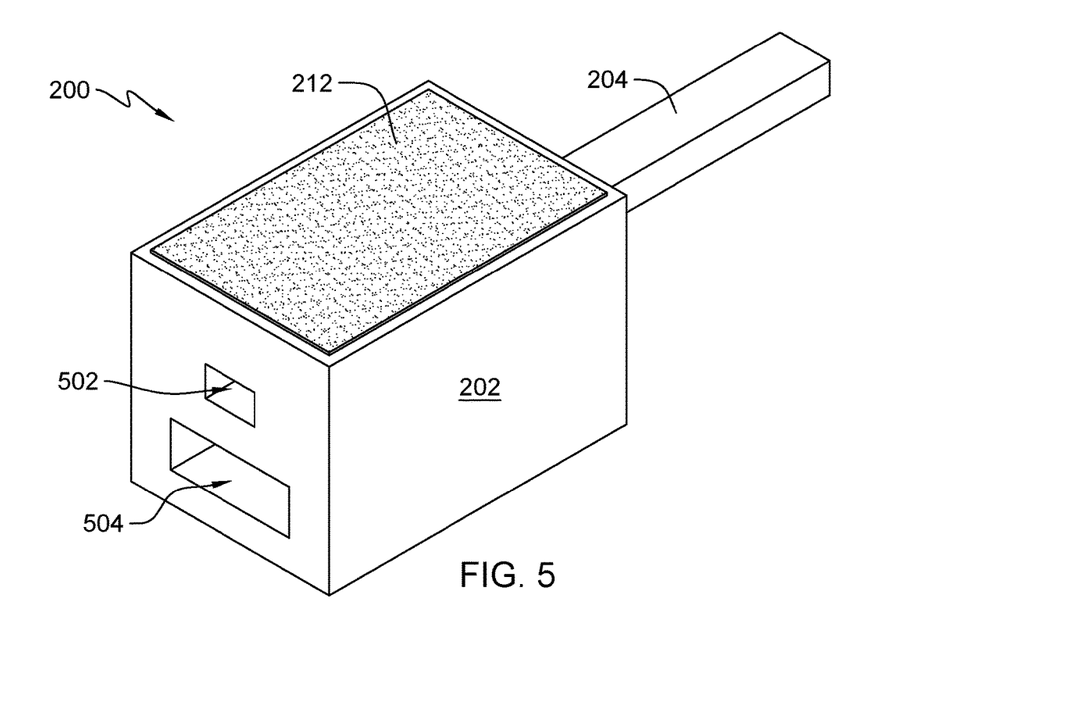
FIG. 5 depicts a 3-dimensional rear view of a wrap plug attenuation adjustment tool, in accordance with an embodiment of the present invention.

FIG. 5 depicts a 3-dimensional rear view of a wrap plug attenuation adjustment tool, in accordance with an embodiment of the present invention. Attenuation adjustment tool 200 includes display 212 positioned on a top surface of body 202, where display 212 can be a visual display and/or touchscreen display that is utilized as a user interface to set a desired attenuation level and receive progress information. The progress information can include but is not limited to a current attenuation level, whether a desired attenuation level was reached, a partial attenuation level that was achieved if the desired attenuation level was not reached, a part number and/or serial number of the attached adjustable attenuation wrap plug 106, and historical attenuation data for the attached adjustable attenuation wrap plug 106. Cavity 502 provides a void for adjustment arm 204 to retract into body 202 of attenuation adjustment tool 200. Connection port 504 allows for an external device to electrically couple to attenuation adjustment tool 200 to set a desired attenuation level for the attached adjustment attenuation wrap plug 106 and view progress information, previously discussed above. Connection port 504 can be a USB connector, a USB-C connector, an HDMI connector, a lighting connector, an ethernet connector, or any other connector capable of transferring data. In other embodiments, attenuation adjustment tool 200 include two optical prongs (i.e., input and output) on a rear panel, where attenuation adjustment tool 200 is insertable into optical ports 104 on end product 100 and adjustable attenuation wrap plug 106 is insertable into optical ports 206 on attenuation adjustment tool 200.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 6:
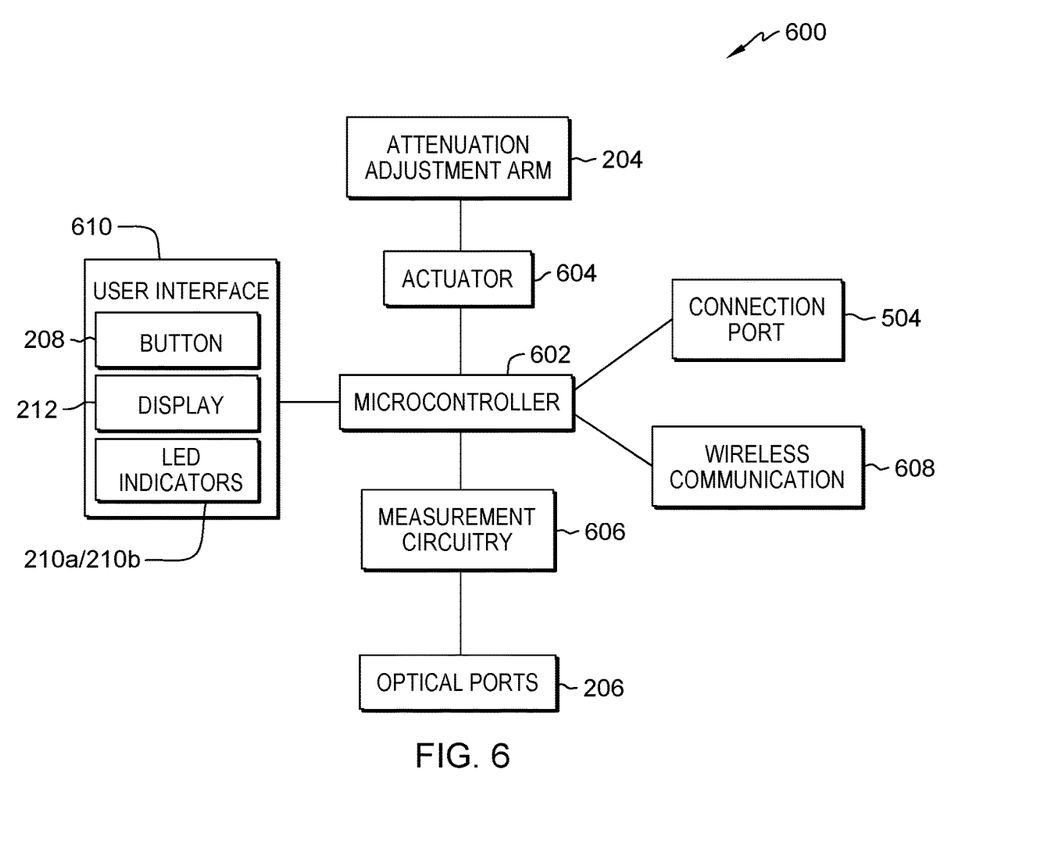
FIG. 6 depicts a control system for a wrap plug attenuation adjustment tool, in accordance with an embodiment of the present invention.

FIG. 6 depicts a control system for a wrap plug attenuation adjustment tool, in accordance with an embodiment of the present invention. In this embodiment, control system 600 for attenuation adjustment tool 200 includes connection port 504, actuator 604, measurement circuitry 606, wireless communication module 608, and user interface 610 all controlled by microcontroller 602. User interface 610 includes selection button 208, status indicators 210a and 210b, and display 212. Measurement circuitry 606 determines a level of attenuation for adjustable attenuation wrap plug 106 by sending a signal through an output of optical ports 206, where adjustable attenuation wrap plug 106 returns the sent signal back to an input of optical ports 206. Actuator 604 is a device capable of translating movements to adjustment arm 204, where actuator 604 can be a linear actuator, a solenoid, a shape-memory alloy, a rack and pinion gear, or any device capable of translating linear motion to adjustment arm 204. As previously discussed, connection port 504 allows for an external device to electrically couple to attenuation adjustment tool 200 to set a desired attenuation level for the attached adjustment attenuation wrap plug 106 and view progress information. Connection port 504 can be a USB connector, a USB-C connector, an HDMI connector, a lighting connector, an ethernet connector, or any other connector capable of transferring data. Wireless communication module 608 allows for an alternative method for an external device to connect to attenuation adjustment tool 200 to set a desired attenuation level for the attached adjustment attenuation wrap plug 106 and view progress information. Wireless communication module 608 can be a device that communicates via protocols that include but are not limited to radio-frequency identification (RFID), near-field communication (NFC), Bluetooth®, and Wi-Fi™.

Figure 7:
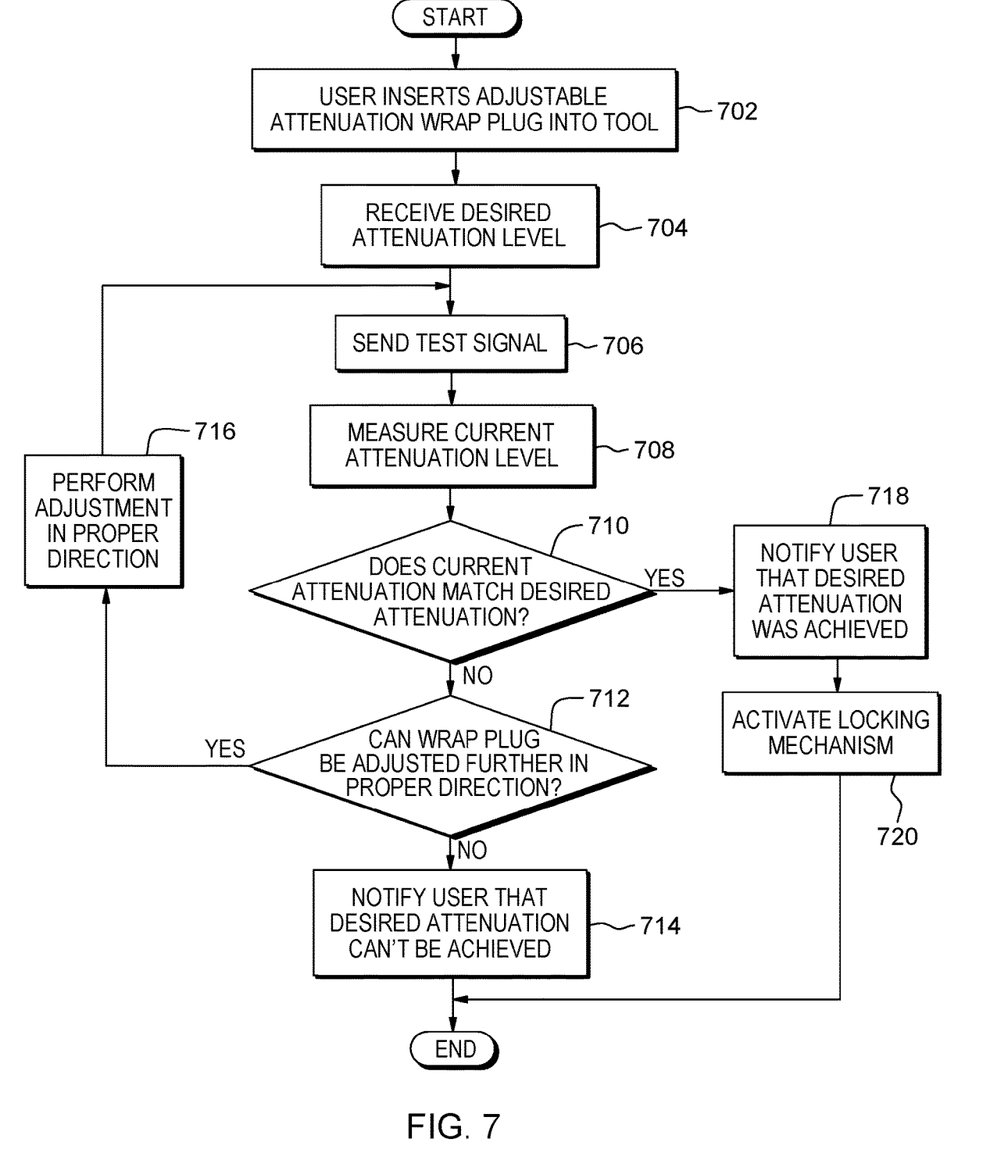
FIG. 7 is a flowchart depicting operational steps for utilizing a wrap plug attenuation adjustment tool, in accordance with one embodiment of the present invention.

FIG. 7 is a flowchart depicting operational steps for utilizing a wrap plug attenuation adjustment tool, in accordance with one embodiment of the present invention.

For setting and verifying attenuation for adjustable attenuation wrap plug 106, a user inserts adjustable attenuation wrap plug into the attenuation adjustment tool (702). Input prong 310 and output prong 314 are inserted into optical ports 206 of attenuation adjustment tool 200, where attenuation adjustment pawl 320 is temporary interlocked to adjustment arm 204 of attenuation adjustment tool 200. Adjustment arm 204 can open a locking mechanism on adjustable attenuation wrap plug 106 subsequent to insertion of input prong 310 and output prong 314 into optical ports 206, where the locking mechanism in a closed position prevents the movement of attenuation adjustment pawl 320 and the locking mechanism in an open position allows for the movement of attenuation adjustment pawl 320. The locking mechanism on adjustable attenuation wrap plug 106 prevents accidental attenuation adjustment subsequent to attenuation adjustment tool 200 setting a desired attenuation but prior to attenuation wrap plug 106 being inserted into optical ports 104 on end product 100, which can negatively impact testing results.

Subsequently, an attenuation adjustment program operating on attenuation adjustment tool 200 receives desired attenuation level (704). Attenuation adjustment tool 200 has the ability to receive the desired attenuation level via a user interface on display 212 on attenuation adjustment tool 200, via an external device electrically coupled to connection port 504 on attenuation adjustment tool 200, and/or via a wireless connection utilizing wireless communication module 608 on attenuation adjustment tool 200. The attenuation adjustment program sends a test signal (706) through adjustable attenuation wrap plug 106, where the transmitted power of attenuation adjustment tool 200 is a known value. The signal travels from an output port of optical ports 206 on attenuation adjustment tool 200 to input prong 310 of adjustable attenuation wrap plug 106, through optical fiber 306 to output prong 314, and back to attenuation adjustment tool 200 via an input port of optical ports 206. The attenuation adjustment program measures a current attenuation level (708) for adjustable attenuation wrap plug 106 based on the transmitted test signal.

The attenuation adjustment program determines whether a current attenuation matches a desired attenuation (decision 710), where the current attenuation is within a tolerance relative to the desired attenuation (e.g., +/−5%). Responsive to determining the current attenuation does not match the desire attenuation ("no" branch, 710), the attenuation adjustment program determines whether the adjustable attenuation wrap plug can be adjusted further in a proper direction (decision 712). Responsive to determining the current attenuation does match the desire attenuation ("yes" branch, 710), the attenuation adjustment program notifies the user that the desired attenuation was achieved (718).

The attenuation adjustment program determines whether the adjustable attenuation wrap plug can be adjusted further in a proper direction (decision 712). The determination is performed based on whether or not attenuation adjustment tool 200 can move attenuation adjustment pawl 220 on adjustable attenuation wrap plug 106 in the proper direction (i.e., −x-axis or +x-axis direction) to reach the desired attenuation level. Responsive to determining the adjustable attenuation wrap can be adjusted in the proper direction ("yes" branch, 712), the attenuation adjustment program performs the adjustment in the proper direction (716). Attenuation adjustment tool 200 performs the adjustment in the proper direction (i.e., −x-axis or +x-axis direction) by activating actuator 604 to move adjustment arm 204, thus resulting in a translated motion of attenuation adjustment pawl 320. The process reverts back to sending a test signal (706) to determine if the adjustment has achieved the desired attenuation level.

Responsive to determining the adjustable attenuation wrap cannot be adjusted in the proper direction ("no" branch, 712), the attenuation adjustment program notifies the user that the desired attenuation cannot be achieved (714). As previously discussed, first end stop 326 and second end stop 328 of adjustable attenuation wrap plug 106 represent a point where attenuation adjustment pawl 320 can no longer move in the +x-axis direction and the −x-axis direction, respectively. Therefore, when attenuation adjustment pawl 320 of adjustable attenuation wrap 106 reaches first end stop 326 or second end stop 328, the attenuation adjustment program determines adjustable attenuation wrap plug 106 cannot be adjusted in the proper direction (i.e., +x-axis or −x-axis direction). The attenuation adjustment program operating on attenuation adjustment tool 200 notifies the user that the desired attenuation cannot be reach via an external device electrically coupled to connection port 504 on attenuation adjustment tool 200, and/or via a wireless connection utilizing wireless communication module 608 on attenuation adjustment tool 200. The attenuation adjustment program can also notify the user via display 212 and/or indicators 210a and/or 210b (e.g., an active red LED indicates an attenuation cannot be reached) on attenuation adjustment tool 200. Attenuation adjustment tool 200 can notify the user of the achieved attenuation level relative to the desired attenuation level. The attenuation adjustment program can further provide a recommendation, via a notification, to clean adjustable attenuation wrap plug 106 to achieve the desired attenuation level.

For the attenuation adjustment program notifying the user that the desired attenuation was achieved (718), the attenuation adjustment program operating on attenuation adjustment tool 200 notifies the user that the desired attenuation was reached via an external device electrically coupled to connection port 504 on attenuation adjustment tool 200, and/or via a wireless connection utilizing wireless communication module 608 on attenuation adjustment tool 200. The attenuation adjustment program can also notify the user via display 212 and/or indicators 210a and/or 210b (e.g., an active green LED indicates an attenuation was achieved) on attenuation adjustment tool 200. The attenuation adjustment program can subsequently activate the locking mechanism (720) on adjustable attenuation wrap plug 106, where the locking mechanism on adjustable attenuation wrap plug 106 is set in a closed position preventing the movement of attenuation adjustment pawl 320 and an alteration in the desired attenuation level.

Figure 8:
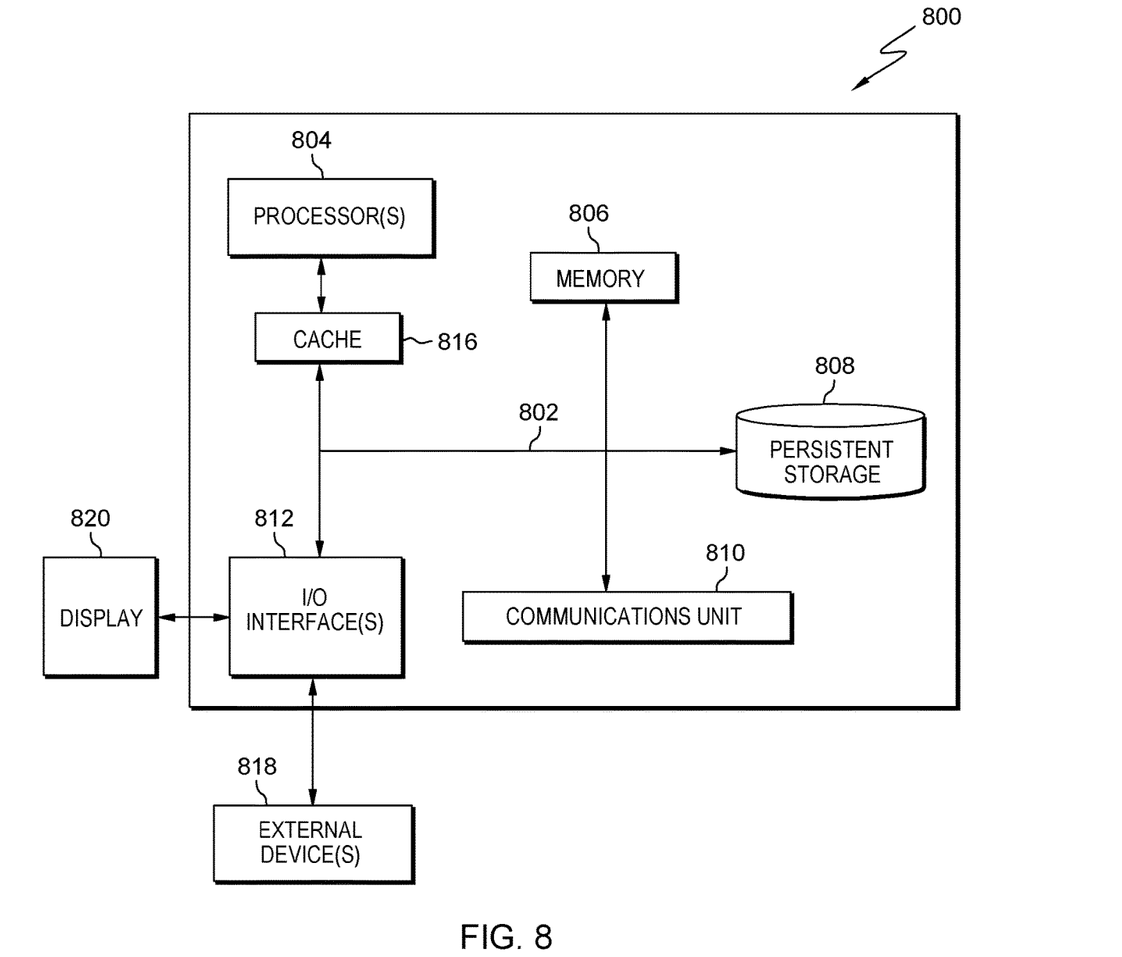
FIG. 8 depicts a block diagram of components of a computer system for performing the operational steps of the attenuation adjustment program, in an embodiment, in accordance with the present invention.

FIG. 8 depicts a block diagram of components of a computer system for performing the operational steps of the attenuation adjustment program, in an embodiment, in accordance with the present invention. Computer system 800 represents an example of microcontroller 602 that includes the attenuation adjustment program operating on attenuation adjustment tool 200. The computer system includes processors 804, cache 816, memory 806, persistent storage 808, communications unit 810, input/output (I/O) interface(s) 812 and communications fabric 802. Communications fabric 802 provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present invention may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for a wrap plug attenuation adjustment tool, the apparatus comprising:
   a body with an adjustment arm positioned at a first side of the body, wherein an actuator is configured to extend and retract the adjustment arm;
   an input port and an output port positioned at the first side of the body, wherein an input prong and an output prong of a wrap plug are each respectively insertable into the input port and the output port; and the adjustment arm configurable to engage with a mechanism on the wrap plug, wherein the mechanism is configurable to alter a shape of a signal cable in the wrap plug.

2. The apparatus of claim 1, further comprising:
one or more visual indicators on the body, wherein the one or more visual indicators provide status information.

3. The apparatus of claim 2, wherein the status information is selected from a group consisting of: whether an attenuation adjustment is in progress, an error has occurred during the attenuation adjustment, and whether a desired attenuation level for the wrap plug has been reached.

4. The apparatus of claim 1, further comprising:
a display on the body, wherein the display includes a user interface for configuring the wrap plug attenuation adjustment tool.

5. The apparatus of claim 1, further comprising:
a connection port on the body for electrically coupling an external device for configuring the wrap plug attenuation adjustment tool.

6. The apparatus of claim 5, wherein the connection port is selected from a group consisting of: a USB connector, a USB-C connector, an HDMI connector, a lighting connector, and an ethernet connector.

7. The apparatus of claim 1, further comprising:
a wireless communication module positioned in the body for communicating with an external device for configuring the wrap plug attenuation adjustment tool.

8. The apparatus of claim 7, wherein the wireless communication module is a device that communicates via protocols selected from a group consisting of: radio-frequency identification (RFID), near-field communication (NFC), Bluetooth®, and Wi-Fi™.

9. The apparatus of claim 1, wherein the actuator is a device selected from a group consisting of: a linear actuator, a solenoid, a shape-memory alloy, and a rack and pinion gear.

10. The apparatus of claim 1, wherein the adjustment arm is further configurable to engage with an attenuation adjustment pawl of the mechanism on the wrap plug, wherein the attenuation adjustment pawl is configurable to alter the shape of the signal cable in the wrap plug.

11. The apparatus of claim 10, wherein the adjustment arm is configurable to activate a locking mechanism on the wrap plug to prevent movement of the attenuation adjustment pawl.

12. The apparatus of claim 11, wherein the adjustment arm is configurable to deactivate the locking mechanism on the wrap plug to allow for movement of the attenuation adjustment pawl.

13. A method for configuring a wrap plug utilizing an attenuation adjustment tool, the method comprising:
responsive to receiving a desired attenuation level for the wrap plug, sending, by one or more processors, a test signal through the wrap plug;
measuring, by one or more processors, a current attenuation level for the wrap plug based on the test signal;
responsive to determining the current attenuation level does not match the desired attenuation level, performing, by one or more processors, an adjustment to the wrap plug, wherein an adjustment arm on the attenuation adjustment tool engages a mechanism on the wrap plug to alter a shape of a signal cable in the wrap plug.

14. The method of claim 13, wherein sending the test signal through the wrap plug comprises:
sending, by one or more processors, a signal through an output port of the attenuation adjustment tool to an input prong on the wrap plug, wherein the signal cable connects the input prong to an output prong on the wrap plug; and
receiving, by one or more processors, the signal at an input port of the attenuation adjustment tool from the output prong on the wrap plug.

15. The method of claim 13, further comprising:
notifying, by one or more processors, a user that the desired attenuation level has been reached for the wrap plug.

16. The method of claim 15, further comprising:
activating, by one or more processors, a locking mechanism on the wrap plug, wherein the locking mechanism prevents an alteration to the desired attenuation level.

17. The method of claim 13, further comprising:
receiving, by one or more processors, the desired attenuation level for the wrap plug via a user interface on the attenuation adjustment tool.

18. The method of claim 13, further comprising:
receiving, by one or more processors, the desired attenuation level for the wrap plug via an external device electrically coupled to a connection portion on the attenuation adjustment tool.

19. The method of claim 13, further comprising:
receiving, by one or more processors, the desired attenuation level for the wrap plug via an external device connected to a wireless communication module on the attenuation adjustment tool.

20. The method of claim 13, further comprising:
displaying, by one or more processors, progress information to a user for the attenuation adjustment tool, the progress information includes the current attenuation level, whether the desired attenuation level was reached, a partial attenuation level that was achieved if the desired attenuation level was not reached, a part number and serial number of the wrap plug, and historical attenuation data for the wrap plug.

* * * * *